(12) United States Patent
Hoogeboom et al.

(10) Patent No.: US 11,276,140 B2
(45) Date of Patent: Mar. 15, 2022

(54) METHOD AND DEVICE FOR DIGITAL IMAGE, AUDIO OR VIDEO DATA PROCESSING

(71) Applicant: Robert Bosch GmbH, Stuttgart (DE)

(72) Inventors: Emiel Hoogeboom, Amsterdam (NL); Dan Zhang, Leonberg (DE); Max Welling, Bussum (NL)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 16/701,755

(22) Filed: Dec. 3, 2019

(65) Prior Publication Data

US 2020/0184595 A1 Jun. 11, 2020

(30) Foreign Application Priority Data

Dec. 6, 2018 (EP) .................................... 18210716

(51) Int. Cl.
*G06K 9/00* (2006.01)
*G06T 3/00* (2006.01)
*H04N 19/182* (2014.01)
*G06K 9/62* (2022.01)
(Continued)

(52) U.S. Cl.
CPC .......... *G06T 3/0056* (2013.01); *G06K 9/6256* (2013.01); *G06K 9/66* (2013.01); *G06N 3/08* (2013.01); *G06T 3/0093* (2013.01); *H04N 19/182* (2014.11)

(58) Field of Classification Search
CPC ........ G06K 9/40; G06K 9/00228; G06K 9/66; G06K 9/6256; H04N 7/50; H04N 7/30; H04N 7/26244; H04N 7/26313; H04N 7/26106; H04N 19/182; G06T 5/001; G06T 5/40; G06T 5/20; G06T 5/50; G06T 5/006; G06T 11/60; G06T 11/001; G06T 3/00;
(Continued)

(56) References Cited

U.S. PATENT DOCUMENTS 5,611,030 A * 3/1997 Stokes .................. G06T 11/001
345/590
6,973,124 B2 * 12/2005 Miller ...................... H04K 1/02
375/222

(Continued)

OTHER PUBLICATIONS

Aaron Oord et al., "Conditional Image Generation With PixelCNN Decoders", 2016, pp. 1-13, XP055585608.
(Continued)

*Primary Examiner* — Amir Alavi
(74) *Attorney, Agent, or Firm* — Norton Rose Fulbright US LLP; Gerard Messina

(57) ABSTRACT

Computer implemented method for digital image data, digital video data or digital audio data enhancement, and a computer implemented method for encoding or decoding this data in particular for transmission or storage, wherein an element representing a part of said digital data comprises an indication of a position of the element in an ordered input data of a plurality of data elements, wherein a plurality of elements is transformed to a representation depending on an invertible linear mapping, wherein the invertible linear mapping maps the input of the plurality of elements to the representation, wherein the invertible linear mapping comprises at least one autoregressive convolution.

20 Claims, 4 Drawing Sheets

(51) Int. Cl.
 *G06K 9/66* (2006.01)
 *G06N 3/08* (2006.01)
(58) Field of Classification Search
 CPC ........... G06T 3/40; G06T 3/60; G06T 3/0056; G06T 3/0093; G06F 17/148; G06N 3/08
 See application file for complete search history.

(56) References Cited

U.S. PATENT DOCUMENTS

| | | | | |
|---|---|---|---|---|
| 7,116,830 | B2* | 10/2006 | Srinivasan | H04N 19/625 |
| | | | | 382/236 |
| 7,263,232 | B2* | 8/2007 | Srinivasan | H04N 19/625 |
| | | | | 382/238 |
| 7,848,580 | B2* | 12/2010 | Horie | H04N 19/136 |
| | | | | 382/232 |
| 7,876,974 | B2* | 1/2011 | Brajovic | G06T 5/002 |
| | | | | 382/264 |
| 8,743,291 | B2* | 6/2014 | Li | G06T 5/009 |
| | | | | 348/708 |
| 9,264,681 | B2* | 2/2016 | Gish | H04N 9/68 |
| 10,218,917 | B2* | 2/2019 | Van Der Vleuten | G09G 5/10 |
| 2002/0184272 | A1* | 12/2002 | Burges | H04N 19/63 |
| | | | | 708/203 |
| 2005/0276504 | A1* | 12/2005 | Chui | G06T 5/20 |
| | | | | 382/264 |
| 2018/0025257 | A1 | 1/2018 | van den Oord et al. | |
| 2020/0184595 | A1* | 6/2020 | Hoogeboom | G06T 5/00 |

OTHER PUBLICATIONS

Diederik P Kingma et al., "Glow: Generative Flow With Invertible 1X1 Convolutions", ARXIV: Org, Cornell University Library, 201 Olin Library Cornell University Ithaca, NY 14853, 2018, pp. 1-15, XP081112373.

Mathieu Germain et al., "Made: Masked Autoencoder for Distribution Estimation", 2015, pp. 1-9, XP055585618.

Tim Salimans, et al., "Pixel-CNN++: Improving the PixelCNN With Discretized Logistic Mixture Likelihood and Other Modifications," ARXIV Preprint ARXIV:1701.05517, 2017, pp. 1-10.

Laurent Dinh, et al., "Density Estimation Using Real NVP", ARXIV Preprint ARXIV:1605.08803, 2016, pp. 1-32.

* cited by examiner

METHOD AND DEVICE FOR DIGITAL IMAGE, AUDIO OR VIDEO DATA PROCESSING

CROSS REFERENCE

The present application claims the benefit under 35 U.S.C. § 119 of European Patent Application No. EP 18210716.9 filed on Dec. 6, 2018, which is expressly incorporated herein by reference in its entirety.

FIELD

The present invention relates to a method and a device for digital image, audio or video data processing. In particular the present invention relates to a computer implemented method and a device for enhancement, transmission or storage of digital image, audio or video data based on generative modelling.

BACKGROUND INFORMATION

Generative modelling has been approached using likelihood-based methods and non-likelihood-based methods. Likelihood based methods are based on autoregressive models and generative flows.

Tim Salimans, Andrej Karpathy, Xi Chen, and Diederik P Kingma "Pixel-cnn++: Improving the pixelcnn with discretized logistic mixture likelihood and other modifications," arXiv preprint arXiv:1701.05517, 2017 and Aaron van den Oord, Nal Kalchbrenner, Lasse Espeholt, Oriol Vinyals, Alex Graves, et al. "Conditional image generation with pixelcnn decoders," in Advances in Neural Information Processing Systems, pp. 4790-4798, 2016 describe aspects of autoregressive models.

SUMMARY

In one aspect of the present invention, computer implemented methods with significantly improved performance are provided for enhancement, transmission or storage of digital image, audio or video data. The computer implemented methods provide improved performance in particular for image transformation, for image recognition, for anomaly detection and/or for image validation. Additionally, or alternatively the computer implemented methods provide control of an at least partial autonomous vehicle or robot.

In another aspect of the present invention, corresponding devices in particular implementing a significantly improved design of a neural network according to the computer implemented methods is provided.

In accordance with the present invention, a computer implemented method for digital image enhancement is provided which includes that an element representing a pixel of a digital image comprises an indication of a spatial dimension, the spatial dimension indicating a position of the pixel in the digital image, and wherein the element comprises an indication of a channel dimension, the channel dimension indicating a channel of the pixel in the digital image, wherein a plurality of elements representing pixels of the digital image is transformed to a representation depending on an invertible linear mapping, wherein the invertible linear mapping maps an input of the plurality of elements to the representation, wherein the representation is modified to determine a modified representation depending on the representation, and wherein a plurality of elements representing pixels of an enhanced digital image is determined depending on the modified representation, wherein the modified representation is transformed depending on an inversion of the invertible linear mapping and wherein the invertible linear mapping comprises at least one autoregressive convolution. The autoregressive convolution allows the inversion of the invertible linear mapping and provides enhanced image with effective data processing.

Advantageously, in accordance with the present invention, the computer implemented method includes that a plurality of digital images of a digital video are processed according to this method. This allows sequential image processing for video data.

In accordance with the present invention, a computer implemented method for digital video enhancement includes that an element representing a pixel of a digital image of the digital video comprises an indication of a spatial dimension, the spatial dimension indicating a position of the pixel in the digital image, and wherein the element comprises an indication of a channel dimension, the channel dimension indicating a channel of the pixel in the digital image and an indication of a time dimension, the time dimension indicating a position of the digital image in the video timeline, wherein a plurality of elements representing pixels of the digital image is transformed to a representation depending on an invertible linear mapping, wherein the invertible linear mapping maps an input of the plurality of elements to the representation, wherein the representation is modified to determine a modified representation depending on the representation, and wherein a plurality of elements representing pixels of an enhanced digital video is determined depending on the modified representation, wherein the modified representation is transformed depending on an inversion of the invertible linear mapping and wherein the invertible linear mapping comprises at least one autoregressive convolution. The autoregressive convolution allows the inversion of the invertible linear mapping and provides enhanced video with effective data processing.

In accordance with the present invention, a computer implemented method for digital audio enhancement includes that an element representing a part of a digital audio sample comprises an indication of a spatial dimension, wherein the indication of the spatial dimension is a constant value, in particular one, and wherein the element comprises an indication of a time dimension, the time dimension indicating a position in an audio timeline of the audio sample, wherein a plurality of elements representing parts of the audio sample is transformed to a representation depending on an invertible linear mapping, wherein the invertible linear mapping maps an input of the plurality of elements to the representation, wherein the representation is modified to determine a modified representation depending on the representation, and wherein a plurality of elements representing parts of an enhanced digital audio sample is determined depending on the modified representation, wherein the modified representation is transformed depending on an inversion of the invertible linear mapping and wherein the invertible linear mapping comprises at least one autoregressive convolution. The autoregressive convolution allows the inversion of the invertible linear mapping and provides enhanced audio with effective data processing.

Advantageously, in accordance with the present invention, the digital audio sample comprises audio channels, wherein the element comprises an indication of a channel dimension, the channel dimension indicating an audio channel in the audio sample, and a plurality of elements comprising the indication of the channel dimension and representing parts of the audio sample is transformed to a representation depending on an invertible linear mapping, wherein the invertible linear mapping maps an input of the plurality of elements comprising the indication of the channel dimension to the representation, wherein the representation is modified to determine a modified representation depending on the representation, and wherein a plurality of elements comprising the indication of the channel dimension and representing parts of an enhanced digital audio sample is determined depending on the modified representation, wherein the modified representation is transformed depending on an inversion of the invertible linear mapping. This provides further improvement for processing audio having several channels.

In accordance with the present invention, a computer implemented method for encoding digital image data for reliable and/or efficient transmission or storage comprises that an element representing a pixel of a digital image comprises an indication of a spatial dimension, the spatial dimension indicating a position of the pixel in the digital image, and wherein the element comprises an indication of a channel dimension, the channel dimension indicating a channel of the pixel in the digital image, wherein a plurality of elements representing pixels of the digital image is transformed to a representation depending on an invertible linear mapping, wherein the invertible linear mapping maps an input of the plurality of elements to the representation, wherein the representation is transmitted or stored and wherein the invertible linear mapping comprises at least one autoregressive convolution. The autoregressive convolution allows the inversion of the invertible linear mapping and provides enhanced encoding with effective data processing.

In accordance with the present invention, a computer implemented method for decoding digital image data for reliable and/or efficient transmission or storage, comprises that, a representation is received from transmission or read from storage, and wherein a plurality of elements representing pixels of a decoded digital image is determined depending on the representation, wherein the representation is transformed depending on an inversion of an invertible linear mapping, wherein the invertible linear mapping maps an input of a plurality of elements to the representation, wherein an element of the plurality of elements represents a pixel of a digital image comprises an indication of a spatial dimension, the spatial dimension indicating a position of the pixel in the digital image, and wherein the element comprises an indication of a channel dimension, the channel dimension indicating a channel of the pixel in the digital image, wherein the plurality of elements representing pixels of the digital image is transformable to the representation depending on the invertible linear mapping and wherein the invertible linear mapping comprises at least one autoregressive convolution. The autoregressive convolution allows the inversion of the invertible linear mapping and provides enhanced decoding with effective data processing.

In accordance with the present invention, advantageously, for digital video transmission or storage a plurality of digital images of a digital video are processed according to this encoding or decoding method. This allows in particular sequential processing for video data.

In accordance with the present invention, a computer implemented method for encoding digital video data for reliable and/or efficient transmission or storage, comprises that an element representing a pixel of a digital image of the digital video comprises an indication of a spatial dimension, the spatial dimension indicating a position of the pixel in the digital image, and wherein the element comprises an indication of a channel dimension, the channel dimension indicating a channel of the pixel in the digital image and an indication of a time dimension, the time dimension indicating a position of the digital image in the video timeline, wherein a plurality of elements representing pixels of the digital image is transformed to a representation depending on an invertible linear mapping, wherein the invertible linear mapping maps an input of the plurality of elements to the representation, wherein the representation is transmitted or stored and wherein the invertible linear mapping comprises at least one autoregressive convolution. The autoregressive convolution allows the inversion of the invertible linear mapping and provides enhanced encoding with effective data processing.

In accordance with the present invention, a computer implemented method for decoding digital video data for reliable and/or efficient transmission or storage, comprises that, a representation is received from transmission or read from storage, and wherein a plurality of elements representing pixels of a decoded digital video is determined depending on the representation, wherein the representation is transformed depending on an inversion of an invertible linear mapping, wherein the invertible linear mapping maps an input of a plurality of elements to the representation, wherein an element representing a pixel of a digital image of the digital video comprises an indication of a spatial dimension, the spatial dimension indicating a position of the pixel in the digital image, and wherein the element comprises an indication of a channel dimension, the channel dimension indicating a channel of the pixel in the digital image and an indication of a time dimension, the time dimension indicating a position of the digital image in the video timeline, wherein a plurality of elements representing pixels of the digital image is transformable to the representation depending on the invertible linear mapping and wherein the invertible linear mapping comprises at least one autoregressive convolution. The autoregressive convolution allows the inversion of the invertible linear mapping and provides enhanced decoding with effective data processing.

In accordance with the present invention, a computer implemented method for encoding digital audio data, is characterized in that an element representing a part of a digital audio sample comprises an indication of a spatial dimension, wherein a first indication and a second indication of the spatial dimension is a constant value, in particular one, and wherein the element comprises an indication of a time dimension, the time dimension indicating a position in an audio timeline of the audio sample, wherein a plurality of elements representing parts of the audio sample is transformed to a representation depending on an invertible linear mapping, wherein the invertible linear mapping maps an input of the plurality of elements to the representation, and wherein the representation is transmitted or stored and wherein the invertible linear mapping comprises at least one autoregressive convolution. The autoregressive convolution allows the inversion of the invertible linear mapping and provides enhanced encoding with effective data processing.

Advantageously, in accordance with the present invention, the digital audio sample comprises audio channels, wherein the element comprises an indication of a channel dimension, the channel dimension indicating an audio channel in the audio sample, and a plurality of elements comprising the indication of the channel dimension and representing parts of the audio sample is transformed to a representation depending on an invertible linear mapping, wherein the invertible linear mapping maps an input of the plurality of elements comprising the indication of the channel dimension to the representation and wherein the representation is transmitted or stored. This allows efficient processing of audio with several channels.

In accordance with the present invention, a computer implemented method for decoding digital audio data for reliable and/or efficient transmission or storage, is characterized in that, a representation is received from transmission or read from storage, and wherein a plurality of elements representing parts of decoded digital audio data is determined depending on the representation, wherein the representation is transformed depending on an inversion of an invertible linear mapping, wherein the invertible linear mapping maps an input of a plurality of elements to the representation, wherein an element representing a part of the digital audio data comprises an indication of a spatial dimension, wherein a first indication and a second indication of the spatial dimension is a constant value, in particular one, and wherein the element comprises an indication of a time dimension, the time dimension indicating a position of the digital image in an audio timeline of the audio sample, wherein a plurality of elements representing parts of the audio sample is transformable to the representation depending on the invertible linear mapping and wherein the invertible linear mapping comprises at least one autoregressive convolution. The autoregressive convolution allows the inversion of the invertible linear mapping and provides enhanced decoding with effective data processing.

In accordance with the present invention, advantageously, the digital audio sample comprises audio channels, wherein the element comprises an indication of a channel dimension, the channel dimension indicating an audio channel in the audio sample, and a plurality of elements comprising the indication of the channel dimension and representing parts of the audio sample is transformable to a representation depending on an invertible linear mapping, wherein the invertible linear mapping maps an input of the plurality of elements comprising the indication of the channel dimension to the representation, and wherein a plurality of elements comprising the indication of the channel dimension and representing parts of decoded digital audio data is determined depending on the representation and wherein the invertible linear mapping comprises at least one autoregressive convolution. This allows efficient processing of audio with several channels.

In accordance with the present invention, advantageously, a convolutional neural network for the invertible linear mapping determines the representation from the input. This further improves the efficiency.

In accordance with the present invention, advantageously, the representation is determined depending on a first autoregressive convolution of the input and a first convolution filter, and depending a consecutive second autoregressive convolution of the first autoregressive convolution and a second convolution filter. The consecutive use of different filters, i.e. kernels for the convolutions improves the efficiency further.

In accordance with the present invention, advantageously, the autoregressive convolution imposes an order on the input such that values of the representation for a specific element only depend on elements of the input representing input that is in the imposed order before the specific element in the order. The order may be an order of pixels in a digital representation of an image or video, an order of audio data or the like. This provides a very flexible and efficient processing.

In accordance with the present invention, advantageously, an input of an input dimension is mapped to the representation by a plurality of consecutive autoregressive convolutions, wherein a dimension of the consecutive convolutions is equal or less than the input dimension. This constraint facilitates an efficient convolutional neural network with autoregressive convolutions that allow an invertible linear mapping.

In accordance with the present invention, advantageously, the representation is modified for image transformation, for image recognition, for anomaly detection and/or for image validation. These applications are improvable significantly by modifying the representation.

In accordance with the present invention, advantageously, determining a N-dimensional kernel for the mapping depending on concatenating a plurality of (N−1)-dimensional kernels in particular with identical size one after another along the dimension N. This way a kernel for a (N−1)-dimensional invertible convolution is extended for a N-dimensional invertible convolution.

In accordance with the present invention, advantageously, determining the N-dimensional kernel comprises associating the (N−1)-dimensional kernel to the N-dimensional kernel as a last dimension entry, wherein a size of the last dimension entry of the N-dimensional kernel defines a center value, wherein for any entries of the N-dimensional kernel in the last dimension of the N-dimensional kernel having an index smaller than the center value, arbitrary values are assigned, wherein for any entries in the last dimension having an index larger than the center value, zeros are assigned. This way only past values are considered in the N-dimensional invertible convolution.

In accordance with the present invention, advantageously, an at least partial autonomous vehicle or robot is controlled depending on the representation, depending on a result of processing the representation and/or depending on audio data, video data or image data determined by the inversion of the invertible linear mapping. This provides a framework for significantly improvable control of such devices.

In accordance with the present invention, a device comprises a processor and storage comprising instructions in particular for a convolutional neural network, wherein the processor is adapted to execute at least one of the computer implemented methods, when the instructions are executed by the processor.

In accordance with the present invention, the device advantageously comprises an output adapted to output a result of an image transformation, an image recognition, an anomaly detection and/or an image validation.

In accordance with the present invention, the device advantageously comprises an actuator adapted to control an at least partial autonomous vehicle or robot depending on the representation, depending on a result of processing the representation and/or depending on audio data, video data or image data determined by the inversion of the invertible linear mapping.

Further advantageous aspects of the present invention are apparent from the description below and the figures.

DETAILED DESCRIPTION OF EXAMPLE EMBODIMENTS

Figure 1:
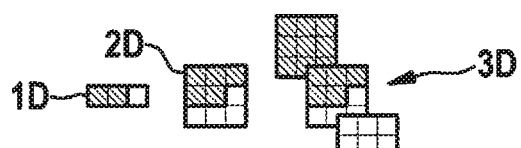
FIG. 1 depicts a visualization of the padding for an auto-regressive convolution with single channels.

In likelihood-based methods for generative modelling, a data distribution p(x) is modelled by maximizing the likelihood of training samples $\{x_i\}$:

$$\max \Pi_i p(x_i) = \max \Sigma_i \log p(x_i). \quad (1)$$

Examples include variational autoencoders, autoregressive models and generative flows.

A variational autoencoder maximizes a lower bound on the likelihood for tractability reason. Autoregressive models and generative flows directly maximize the likelihood by exploiting bijective variable transformation.

The mathematical background behind the autoregressive models, generative flows and the following description of the method is given as follows.

The method aims at learning a generative model distribution by means of bijective random variable transformation.

Assume the existence of a function f that maps x, such as an image, onto a random variable z, i.e., z=f(x).

When f is invertible and thus bijective ($x=f^{-1}(z)$), the complex probability density $p_x(x)$ is equal to the probability density of the transformation under a simple probability density $p_z(z=f(x))$ multiplied by the determinant Jacobian $$\log p_X(x) = \log p_Z(f(x)) + \log\left|\frac{\partial f(x)}{\partial x}\right|. \quad (2)$$

With a tractable prior probability density $P_z(z)$ of z, one can then evaluate the probability density function $p_x(x)$.

In the context of machine learning, a function f is modeled for example by neural networks and then trained to maximize the likelihood of all training samples.

A construction of a corresponding neural network is under two constraints:

Firstly, the log determinant of the Jacobian should be tractable. Secondly, the inverse of the function f is tractable such that new samples can be generated as $x=f^{-1}(z)$. Since the two constraints limit the design space of the function f, the resulting model may only be an approximation. In other words, the design of neural networks to describe the function f is crucial to attain a good modeling accuracy with scalable tractability.

For designing the function f, autoregressive models exploit the following factorization to model the data probability density p(x):

$$p(x) = \Pi_i p(x_i | x_{0:i-1}). \quad (3)$$

Namely, the ith element $x_i$ of x depends on the previously elements $x_0 \ldots x_{i-1}$. With this autoregressive structure, the Jacobian of the inverse of the underlying the function f is triangular, thus equation (2) is easy to evaluate.

To define the factorization in equation (3), the ordering of all elements of x has to be pre-specified, e.g., row-by-row or column-by-column if x is an image and $x_i$ stands for one pixel.

The ordering imposes a sequential structure when modeling the training data samples. However, such structure may not be consistent with the real data generation process, therefore compromising accuracy. Furthermore, when generating samples using the trained autoregressive models, each entry of x has to be sequentially generated, following the given order. This limits its use for latency critical applications.

Generative flows on the other hand do not impose any specific structure on the data. Sample generation can be done in parallel which makes them scalable. However, generative flow transformations have thus far been restricted, namely, the design space of the function f is further narrowed.

In Laurent Dinh, Jascha Sohl-Dickstein, and Samy Bengio. Density estimation using real nvp. arXiv preprint arXiv: 1605.08803, 2016 the authors use a mechanism that separates particular dimensions of the data. An affine transformation on specific dimensions is parametrized by the other dimensions.

In Diederik P Kingma and Prafulla Dhariwal. Glow: Generative flow with invertible 1×1 convolutions. arXiv preprint arXiv:1807.03039, 2018, the authors propose a 1 by 1 invertible convolution, which is a generalization of the channel permutation used in Density estimation using real nvp.

The method described below uses more expressive transformations referred to as invertible 2D convolutions in the following description. 2D in this context refers to two-dimensional, i.e. a two-dimensional convolution is determined in the transformation. The transformation is referred to as invertible linear mapping below. Linear mapping in this context refers to a matrix vector multiplication, that is invertible if the matrix is invertible. Invertible autoregressive convolution is a special type of linear mapping. Its associated matrix is triangular. The invertible 2D convolutions leverage an autoregressive structure to compute exact inverses and are compatible with the layers designed for generative flows. More specifically, an invertible 2D convolution is provided based on autoregressive convolutions. And efficient emerging invertible convolutions are provided with square receptive fields.

In the following description the method is described using digital image data processing. An element $x_{c, d1, d2}$ representing a pixel of a digital image comprises an indication $d_1$, $d_2$ of a spatial dimension $D_1$, $D_2$ and an indication c of a channel dimension C. Pixel in this context refers to a tuple comprising a representation of part of the digital image, e.g. c, $d_1$, $d_2$. An element $x_{c, d1, d2}$ represents in the example a pixel by the indies c, $d_1$, $d_2$.

The spatial dimension $d_1$, $d_2$ indicates a position of the pixel in the digital image. In one aspect, cartesian coordinates, i.e. a first indication $d_1$ of the spatial dimension and a second indication $d_2$ of the spatial dimension, may be used for a rectangular digital image starting from the lower left corner of the digital image. Digital images that are non-rectangular, e.g. oval or round, may be processed by adding pixels to create a digital image with rectangular spatial dimensions.

The channel dimension C indicates a channel of the pixel in the digital image. The channel dimension is generally not limited. For a digital color image, the channel dimension comprises for example the color channels of the digital color image. More specifically, a digital image may be coded according to an additive color model, e.g. using red R, green G, blue B color. For example the color channels R, G, B are coded as channel number R=0, G=1, B=2. A subtractive color model, e.g. the CMYK color model using cyan, magenta, yellow and black may be used alike.

In a digital image coded in a greyscale the channel dimension may reflect the shades of black available for coding. In a black and white digital image, the channel dimension may be reduced to a single channel.

Aspects of invertible autoregressive convolutions, emerging convolutions for 2D convolutions, invertible emerging square convolutions and invertible circular convolutions are described below. These provide the basis for the neural network architecture described thereafter.

Invertible Autoregressive Convolutions

Autoregressive convolutions impose an order on pixels in images, which enforces values to be conditioned only on pixels 'before' and not 'after' a pixel. These convolutions are autoregressive, i.e. are sequentially regressing the following pixel value. The order is enforced in the example by zero padding on convolution filters. FIG. 1 schematically depicts a visualization of the padding for an auto-regressive convolution with single channels. White areas in FIG. 1 denote padding. In FIG. 1, the convolutional filter is a row vector. From the left side of FIG. 1 to the right side of FIG. 1 a 1D, 2D and 3D convolutional padding is depicted. 1D, 2D and 3D refer to dimension of the convolutions, i.e. 1D refers to a one-dimensional convolution, 2D refers to a two-dimensional convolution and 3D refers to a three-dimensional convolution. The 1D convolutional filter in FIG. 1 is of dimension 3 by 1 pixel where the leftmost pixel is zero padded. The 2D convolutional filter is of dimension 3 by 3 pixel where the lowest row of pixels and the rightmost pixel of the second row are zero padded. The 3D convolutional filter uses three convolutional filters of dimension 3 by 3 having different zero padded pixels. In FIG. 1 the pixels of one channel are denoted as small squares in the larger rectangular denoting the filter.

By way of example, an input for an audio signal with a single channel is a temporal dimension whereas the spacial dimensions and the channel dimension becomes one. For this input for example a 1D convolution is used. By way of another example, an input for a grey scale image is a height and a width as spacial dimensions D1, D2 and the channel dimension C and the temporal dimension becomes one. For a colour image with several color channels the input is height, width, channel. For this input a 3D convolution is used. For a video signal the input is height, width, temporal, channel. For this input a 4D convolution is used.

A kernel k for a 1D convolution is for example a row vector as kernel. A kernel k for the 2D convolution is for example a matrix as kernel. For each dimension of the convolution the kernel dimension increases by one dimension. A kernel k for 3D convolution has a cubic dimension.

Generalizing from 1D, 2D and 3D for a N-dimensional invertible convolution, where N is a positive integer N, the following inductive masking strategy applies:

Given a kernel for a (N−1)-dimensional convolution, this kernel is extend to a kernel for N-dimensional convolution.

A N-dimensional kernel can be regarded as of concatenating multiple (N−1)-dimensional kernels with identical size one after another along the dimension N. A size $K_N$ of the last dimension then equals the number of (N−1) dimensional kernels. The entry of the last dimension is indexed by k, ranging from 0 to $K_N-1$. The center value of k is denoted as $k_{ct}$ and equal to floor$((K_N-1)/2)$. Each of the $K_N$ (N−1)-dimensional kernels can be associated to the N-dimensional kernel with the last dimension entry k taking on a specific value between 0 and $K_N-1$. Given a kernel for a (N−1)-dimensional invertible convolution, this kernel is extended for N-dimensional invertible convolution by three steps. First, the (N−1)-dimensional kernel is associated to the N-dimensional kernel with the last dimension entry k being equal to $k_{ct}$. Second, for any entries in the last dimension with their indices smaller than $k_{ct}$, the N-dimensional kernel can take on arbitrary values. Third, for any entries in the last dimension with their indices larger than $k_{ct}$, the N-dimensional kernel can only take on zeros.

For instance, a 5-dimensional kernel is of size $(K_1, K_2, K_3, K_4, K_5)$. $K_5$ stands for the dimension size of the kernel in its last dimension N=5, whereas $K_1, K_2, K_3, K_4$ are the dimension size of the first 4 dimensions of the kernel. With $K_5=5$, the center entry of the last dimension equals $k_{ct}=2$. For the entries of the 5-dimensional kernel that have the last dimension index $k<k_{ct}$ non-zero values may be used. For the other entries that have $k>k_{ct}$ the value zero is used. This means that the convolution doesn't rely on future values, i.e., values that are after $k_{ct}$ in the order of the input. The past information, i.e. values that are before $k_{ct}$ in the order of the input, is used. For $k=k_{ct}$, which indicates the present in the dimension N in the order of input, all previous dimensions are looked at based on the kernel of (N−1) convolution that has been defined.

The linear transformation of the autoregressive convolution is in principle be expressible as a triangular matrix. To compute the determinant Jacobian in linear time, one simply has to look up the diagonal entries of this matrix.

The inverse of an autoregressive convolution is computable by traversing through the imposed order sequentially.

Assume the convolution x*k=z, where the filter k is infinitely padded with zeros outside its bounds and centers at the coordinates (0, 0). The $(d_1, \ldots, d_n)$ elements of z in the channel c equals $$z_{c,d_1,d_2,\ldots,d_n} = \Sigma_{c'=1}^{C}\Sigma_{d'_1=1}^{D1}\Sigma_{d'_2=1}^{D2} \cdots \Sigma_{d'_n}^{Dn} k_{c,c',d'_1-d_1,d'_2-d_2,\ldots,d'_n-d_n} x_{c',d'_1,d'_2,\ldots,d'_n} \quad (4)$$

where c is the index of the channel and $(d_1, \ldots, d_n)$ is the spatial index, i.e. dimension d1, dimension d2 in the example of the digital image. The representation $z_{c, d1, d2}$ of the digital image is a latent variables z that result from linear mapping of elements.

The inverse of the convolution given in equation (4) is computable with a procedure called forward/back substitution, $$x'_{c,d_1,d_2,\ldots d_n} = \frac{1}{k_{c,c,0,\ldots,0}}\left(z_{c,d_1,d_2,\ldots d_n} - \sum_{c'=1}^{C}\sum_{d'_1=1}^{D1}\sum_{d'_2=1}^{D2} \cdots \sum_{d'_n}^{Dn} k_{c,c',d'_1-d_1,d'_2-d_2,\ldots,d'_n-d_n} x_{c',d'_1,d'_2,\ldots d'_n}\right) \quad (5)$$

The inverse $x_{c,d_1,d_2,\ldots,d_n}$ is computed in the order that is imposed by the autoregressive convolutions.

The invertible autoregressive convolution imposes an order on the input such that values of the representation for a specific element only depend on elements of the input representing input that is in the imposed order before the speck element in the order.

An input of an input dimension is mapped to the representation by a plurality of consecutive autoregressive convolutions, wherein a dimension of the consecutive convolutions is equal or less than the input dimension.

In an aspect the representation is determined depending on a first autoregressive convolution of the input and a first convolution filter, and depending on a consecutive second autoregressive convolution of the first autoregressive convolution and a second convolution filter.

In an artificial neural network used for implementing the method, the above is implemented as a convolution layer. Such convolution layer is not only applicable for the input layer of the artificial neural network, but also to hidden layers of the artificial neural network.

As described above, in particular a convolutional neural network for the invertible linear mapping determines the representation from the input. More specifically the representation is determined from the input depending on at least one invertible autoregressive convolution.

Linear mapping in this context in particular for two input channels refers to a first input from a first channel and second input from a second channel being mapped by autoregressive convolution to a latent variable. In general, the invertible linear mapping comprises at least one autoregressive convolution. And the convolutions are invertible because they are autoregressive.

Invertible autoregressive convolution in this context refers to a linear mapping by the autoregressive convolution that imposes an order on the input such that values of the representation of the input only depend on elements representing input that is in the imposed order before the specific input element in the order. Input elements that are after the specific input element in the order are zero padded. This linear mapping, i.e. the autoregressive convolution is invertible by computing the inverse in the order that is imposed by the autoregressive convolution.

Emerging Convolutions for 2D Convolutions

Autoregressive convolutions are less expressive when used independently. The convolution in FIG. 1 is restricted to using values above or to the left of a coordinate of the digital image. However, this limitation can be overcome by compounding different autoregressive convolutions. It is possible to construct emerging convolutions with rich receptive fields, by performing consecutive autoregressive convolutions. The receptive field of emerging convolutions using two successive autoregressive convolutions are depicted in FIG. 2.

Figure 2:
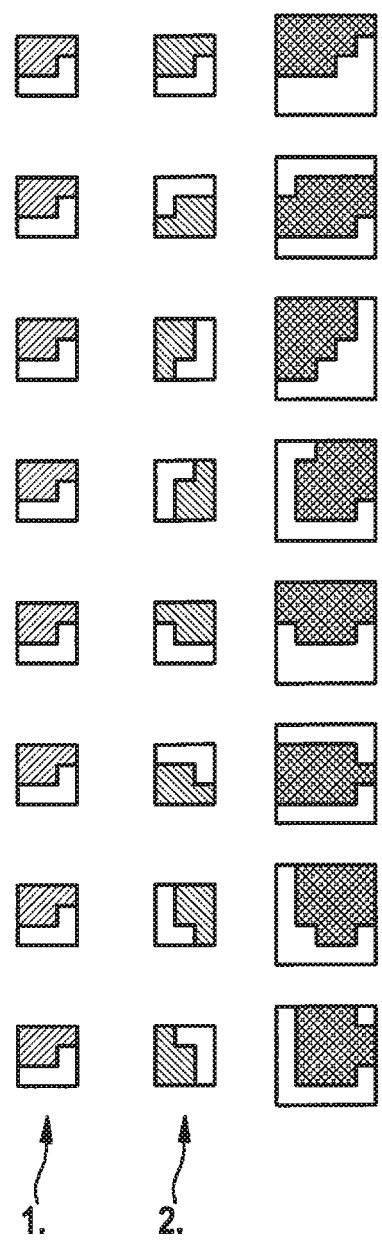
FIG. 2 depicts a visualization of the emerging convolutions in 2D when using two consecutive autoregressive convolutions.

In FIG. 2 each row indicates in the two left columns two successive convolutions applied to the digital image using different convolutional filters. In the example the first convolutional filter in the right column is the same for all rows. In the example the second convolutional filter in the middle column is rotated, inversed or rotated and inversed with respect to the first convolutional filter. The right column indicates an effective convolutional filter according to the successive convolutions. White areas in FIG. 2 denote padding.

Invertible Emerging Square Convolutions

Figure 3:
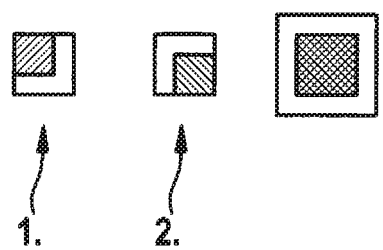
FIG. 3 depicts a construction of emerging square convolutions.

Two autoregressive convolutions can be modified to obtain an equivalent convolution with a square receptive field. This is schematically depicted in FIG. 3. The emerging square convolution for 3 by 3 filters can be computed efficiently with two methods:

a) The convolution can be expressed as two consecutive 2 by 2 convolutions.

b) The filters (g and h) can be convolved to obtain an equivalent 3 by 3 filter. The output of the convolution is then obtained by the convolution between the filter (g★h) and the feature map f:

$$h★(g★f),(h*g)★f$$

Note that in deep learning frameworks, convolutions are often actually cross-correlations. In equations ★ denotes a cross-correlation and denotes a convolution. In the description both operations are referred to as convolutions.

Furthermore, any d by d convolution can be expressed by two consecutive autoregressive k by k convolutions, where $k=(d+1)/2$. It is only during sampling necessary to compute inverses, which will be computed as the inverses of the decomposed convolutions.

Invertible Circular Convolutions

A multiplication of the Fourier transform of two signals, is equivalent to the Fourier transform of their convolution. The computation of a convolution layer is an aggregation of cross-correlations, as shown in equation (6). Note that because the Fourier transform assumes periodic functions, the convolution obtained is circular. These convolutions are a generalization of a 1 by 1 convolution. In other words, a 1×1 convolution is a special case of a circular convolution.

$$z_{cout}=\Sigma_{cin} {}^c k_{cin,cout}★x_{cin} \qquad (6)$$

Every correlation can be written as a multiplication in the frequency domain. Let the function $F(·)$ denote the Fourier transform and $F^{-1}(·)$ the inverse Fourier transform. Let $\hat{z}_{cout}=F(z_{cout})$, $\hat{x}_{cin}=F(x_{cin})$ and $\hat{k}_{cin,cout}=F(k_{cin,cout}*)$ be the output, input and filter signals in frequency domain. Since these are cross-correlations, $k_{cin,cout}*$ denotes the mirror and complex conjugate of $k_{cin,cout}$. In frequency domain the convolution output is computed as an elementwise multiplication (denoted by ⊙) between the frequency domain representations of the filter and input.

$$\hat{z}_{cout}=\Sigma_{cin} {}^c \hat{k}_{cin,cout}\odot \hat{x}_{cin} \qquad (7)$$

The summation is equivalent to a matrix multiplication if we separate the computation at each frequency component u, v. The output vector $\hat{z}_{:,uv}$ can be written as a multiplication of a matrix $\hat{K}_{uv}$ and the input vector $\hat{x}_{:,uv}$, as shown in (8). Here $\hat{K}_{uv}=\hat{k}_{:,:,uv}$ is a cout×cin matrix. The output feature maps can be retrieved by taking the inverse Fourier transform, $z_{cout}=F^{-1}(\hat{z}_{cout})$.

$$\hat{z}_{:,uv}=\hat{K}_{uv}\hat{x}_{:,uv} \qquad (8)$$

Since the Fourier transform and its inverse are unitary transformations, the determinant of the Fourier transform is equal to one. The determinant of the transformation in frequency domain, can be written as a sum of log determinants of the filter (9).

$$\log\det\left|\frac{\partial z}{\partial x}\right|=\log\det\left|\frac{\partial \hat{z}}{\partial \hat{x}}\right|=\sum_{u,v}\log\det \hat{K}_{u,v} \qquad (9)$$

Inverting the circular convolution requires an inversion of the matrix $\hat{K}_{uv}$ for every frequency u, v as shown in (10). The input feature maps are obtained by the inverse Fourier transform, $$x_{cin}=F^{-1}(\hat{x}_{cin}).$$

$$\hat{x}_{:,uv}=\hat{K}^{-1}_{uv}\hat{z}_{:,uv} \qquad (10)$$

Artificial Neural Network Architecture

Figure 4:
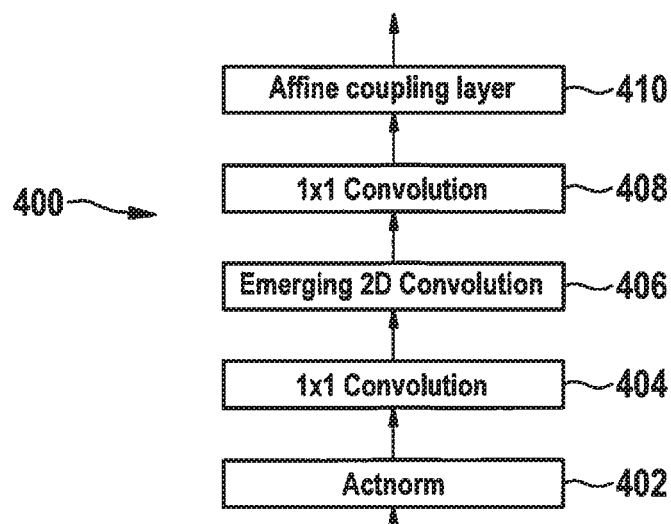
FIG. 4 depicts aspects of a flow module.

An exemplary artificial neural network architecture implementing a generative flow is described below referencing FIG. 4. In a step 402 an activation normalization, short "actnorm", is performed on the input.

The artificial neural network performs for example an affine transformation in particular using a scale and bias parameter per channel and for a mini-batch size 1.

The parameters in this step may be trainable and are initialized for example so that the first minibatch of data have mean 0 and standard deviation 1 after actnorm.

Afterwards in a step 404 a 1×1 convolution is executed. The 1×1 convolution in particular has equal number of input and output channels.

Afterwards in a step 406 an invertible convolution as described above is executed. For example, Emerging convolutions for 2D convolutions, Invertible Emerging Square Convolutions or Invertible Circular Convolutions may be executed in this step.

Afterwards in a step 408 a 1×1 convolution is executed. The 1×1 convolution in particular has equal number of input and output channels.

Afterwards in a step 410 an affine coupling layer is executed to determine the output of the generative flow.

Figure 5:
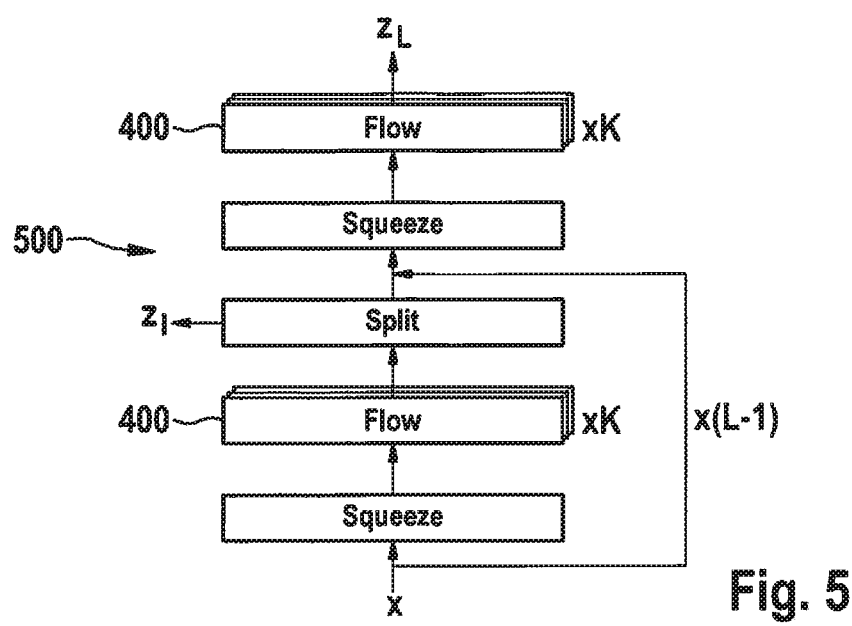
FIG. 5 depicts aspects of a multi-scale architecture.

The steps 402 to 410 are comprised in a new flow module 400 that is comprised as flow module in a multi-scale architecture 500 as depicted in FIG. 5.

The steps 402, 404, 408 and 410 and the multi-scale architecture 500 may be implemented as described in Glow: Generative flow with invertible 1×1 convolutions.

In the multi-scale architecture 500 K means K times flow operations in sequential order. The three steps squeeze, flow operations and split as a whole block are repeated L times. At each time, the split generates one $z_l$ as a partial output of the final z representation and feeds the other to the next squeeze, flow operation and split, which outputs $z_{l+1}$. The last squeeze, flow operation and split generates together with the squeeze and flow operation at the end the last part of z, i.e., $z_L$.

Based on this methodology in the following sections aspects of computer implemented methods are described that significantly improve the performance of enhancement, transmission or storage of digital image, audio or video data. The computer implemented methods provide improved performance in particular for image transformation, for image recognition, for anomaly detection and/or for image validation. The computer implemented methods may be used in control of an at least partial autonomous vehicle or robot.

Enhancing the Digital Image Data

Figure 6:
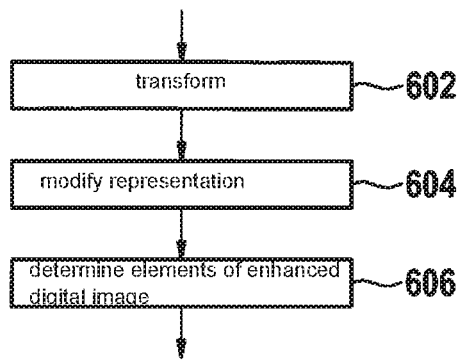
FIG. 6 depicts steps in a method for enhancing digital image data.

A method for enhancing the digital image data is described below referencing FIG. 6.

In a step 602, a plurality of elements $x_{c, d_1, d_2}$ representing pixels of the digital image is transformed to a representation $z_{c, d_1, d_2}$ depending on the invertible linear mapping.

The invertible linear mapping maps an input of the plurality of elements $x_{1, d_1, d_2}$ to the representation $z_{c, d_1, d_2}$.

The representation is for example determined according to the invertible linear mapping $$z_{c,d_1,d_2} = \sum_{c'=1}^{C} \sum_{d'_1=1}^{D1} \sum_{d'_2}^{D2} k_{c,c',d'_1-d_1,d'_2-d_2} x_{c',d'_1,d'_2}$$

In a step 604 the representation $z_{c, d_1, d_2}$ is modified to determine a modified representation $z'_{c, d_1, d_2}$ depending on the representation $z_{c, d_1, d_2}$.

In a step 606 a plurality of elements $x'_{c, d_1, d_2}$ representing pixels of an enhanced digital image is determined depending on the modified representation $z'_{c, d_1, d_2}$. The modified representation $z'_{c, d_1, d_2}$ is transformed depending on an inversion of the invertible linear mapping.

The modified representation $z'_{c, d_1, d_2}$ is transformed depending on an inversion of the invertible linear mapping, for example according to $$x'_{c,d_1,d_2} = \frac{1}{k_{c,c,0,0}} \left( z'_{c,d_1,d_2} - \sum_{c'=1}^{C} \sum_{d'_1=1}^{D1} \sum_{d'_2}^{D2} k_{c,c',d'_1-d_1,d'_2-d_2} x_{c',d'_1,d'_2} \right)$$

The method describe above may be applied to digital audio or digital video processing. Aspects of digital audio or digital video processing will be described below.

Digital Video Enhancement

In one aspect a plurality of digital images of a digital video are processed in particular sequentially for digital video enhancement according to the method for digital image enhancement described above.

Figure 7:
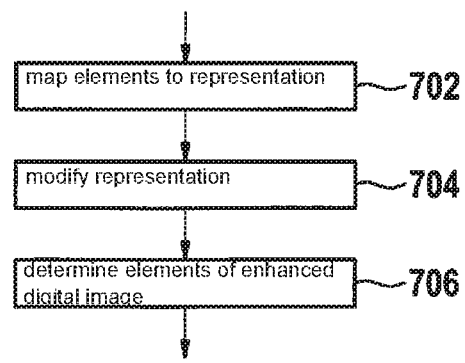
FIG. 7 depicts steps in a method for digital video enhancement.

A computer implemented method for digital video enhancement is described referencing FIG. 7.

An element $x_{c, t, d_1, d_2}$ representing a pixel of a digital image of the digital video comprises an indication $d_1$, $d_2$ of a spatial dimension $D_1$, $D_2$, an indication c of a channel dimension C, an indication t of a time dimension T. Pixel in this context refers to a tuple comprising a representation of part of the digital video, e.g. c, t, $d_1$, $d_2$.

The spatial dimension $D_1$, $D_2$ indicates a position of the pixel in the digital image as described for the digital image processing. The channel dimension C indicates a channel of the pixel in the digital image as described for the digital image processing.

The time dimension T indicates a position of the digital image in the video timeline.

This additional dimension is used in a step 702. In Step 702 a linear mapping maps an input of the plurality of elements $x_{c, t, d_1, d_2}$ to the representation $z_{c, t, d_1, d_2}$. The representation is for example determined according to the invertible linear mapping $$z_{c,t,d_1,d_2} = \sum_{c'=1}^{C} \sum_{t'=1}^{T} \sum_{d'_1=1}^{D1} \sum_{d'_2}^{D2} k_{c,c',t'-t,d'_1-d_1,d'_2-d_2} x_{c',t',d'_1,d'_2}$$

This means that plurality of elements $x_{c, t, d_1, d_2}$ representing pixels of the digital image is transformed to the representation $z_{c, t, d_1, d_2}$ depending on this invertible linear mapping.

In a step 704 the representation $z_{c, t, d_1, d_2}$ is modified to determine a modified representation $z'_{c, t, d_1, d_2}$ depending on the representation $z_{c, t, d_1, d_2}$.

In a step 706, a plurality of elements $x'_{c, t, d_1, d_2}$ representing pixels of an enhanced digital video is determined depending on the modified representation $z'_{c, t, d_1, d_2}$. The modified representation $z'_{c, t, d_1, d_2}$ is transformed depending on an inversion of the invertible linear mapping, for example according to $$x'_{c,t,d_1,d_2} = \frac{1}{k_{c,c,0,0,0}} \left( z'_{c,t,d_1,d_2} - \sum_{c'=1}^{C} \sum_{t'=1}^{t} \sum_{d'_1=1}^{D1} \sum_{d'_2}^{D2} k_{c,c',t'-t,d'_1-d_1,d'_2-d_2} x_{c',t',d'_1,d'_2} \right)$$

Digital Audio Enhancement

Figure 8:
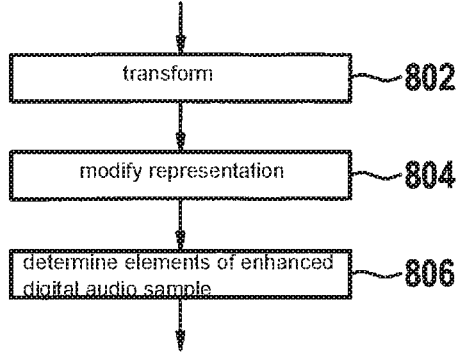
FIG. 8 depicts steps in a method for digital audio data enhancement.

A computer implemented method for digital audio enhancement is described referencing FIG. 8.

An element $x_{t, d_1, d_2}$ representing a part of a digital audio sample comprises a first indication $d_1$ and a second indication $d_2$ of the spatial dimension $D_1, D_2$. And a first indication $d_1$ and a second indication $d_2$ of the spatial dimension $D_1, D_2$ is a constant value, in particular one.

The element $x_{t, d_1, d_2}$ comprises an indication t of a time dimension T. The time dimension T indicates a position in an audio timeline of the audio sample.

In a step 802 a plurality of elements $x_{t, d_1, d_2}$ representing parts of the audio sample is transformed to a representation $z_{t, d_1, d_2}$ depending on an invertible linear mapping. The invertible linear mapping maps an input of the plurality of elements $x_{t, d_1, d_2}$ to the representation $z_{t, d_1, d_2}$. In one aspect there is only one audio channel, i.e. the channel dimension is not used in this example.

The representation is for example determined according to the invertible linear mapping $$z_{t,d_1,d_2} = \sum_{t'=1}^{T} \sum_{d_1'=1}^{D1} \sum_{d_2'}^{D2} k_{t,t',d_1'-d_1,d_2'-d_2} x_{t',d_1',d_2'}$$

In a step 804 the representation $z_{t, d_1, d_2}$ is modified to determine a modified representation $z'_{t, d_1, d_2}$ depending on the representation $z_{t, d_1, d_2}$.

In a step 806 a plurality of elements $x'_{t, d_1, d_2}$ representing parts of an enhanced digital audio sample is determined depending on the modified representation $z'_{t, d_1, d_2}$.

The modified representation $z'_{t, d_1, d_2}$ is transformed depending on an inversion of the invertible linear mapping for example according to $$x'_{t,d_1,d_2} = \frac{1}{k_{t,t,0,0}} \left( z'_{t,d_1,d_2} - \sum_{t'=1}^{t} \sum_{d_1'=1}^{D1} \sum_{d_2'}^{D2} k_{t,t',d_1'-d_1,d_2'-d_2} x_{t',d_1',d_2'} \right)$$

In another aspect, the digital audio sample comprises audio channels. In this example the element $x_{c, t, d_1, d_2}$ comprises an indication c of a channel dimension C. The channel dimension C indicates an audio channel in the audio sample.

In this aspect, in step 802 a plurality of elements $x_{c, t, d_1, d_2}$ comprising the indication c of the channel dimension C and representing parts of the audio sample is transformed to a representation $z_{c, t, d_1, d_2}$ depending on an invertible linear mapping. The invertible linear mapping maps an input of the plurality of elements $x_{c, t, d_1, d_2}$ comprising the indication c of the channel dimension C to the representation $z_{c, t, d_1, d_2}$. The representation is for example determined according to the invertible linear mapping $$z_{c,t,d_1,d_2} = \sum_{c'=1}^{C} \sum_{t'=1}^{T} \sum_{d_1'=1}^{D1} \sum_{d_2'}^{D2} k_{c,c',t'-t,d_1'-d_2,d_2'-d_2} x_{c',t',d_1',d_2'}$$

In step 804 this representation $z_{c, t, d_1, d_2}$ is modified to determine a modified representation $z'_{c, t, d_1, d_2}$ depending on the representation $z_{c, t, d_1, d_2}$.

In step 806 a plurality of elements $x'_{c, t, d_1, d_2}$ comprising the indication c of the channel dimension C and representing parts of an enhanced digital audio sample is determined depending on the modified representation $z'_{c, t, d_1, d_2}$. The modified representation $z'_{c, t, d_1, d_2}$ is transformed depending on an inversion of the invertible linear mapping, for example according to $$x'_{c,t,d_1,d_2} = \frac{1}{k_{c,c,0,0,0}} \left( z'_{c,t,d_1,d_2} - \sum_{c'=1}^{C} \sum_{t'=1}^{t} \sum_{d_1'=1}^{D1} \sum_{d_2'}^{D2} k_{c,c',t'-t,d_1'-d_1,d_2'-d_2} x_{c',t',d_1',d_2'} \right)$$

Encoding and Decoding Digital Image Data, Transmission or Storage

Figure 9:
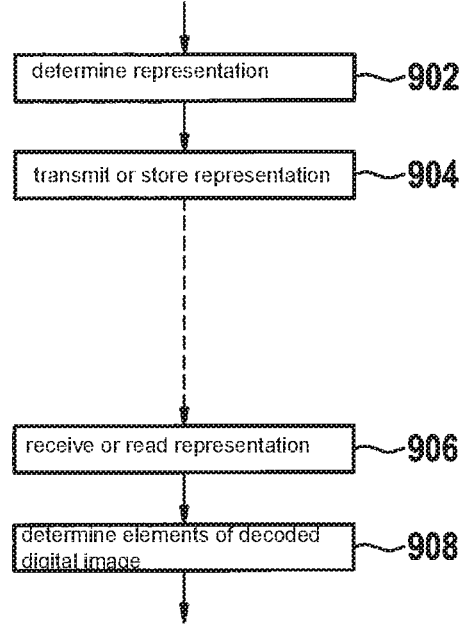
FIG. 9 depicts steps in a method for encoding and decoding digital image data.

A method for encoding digital image data and a method for decoding digital image data is described referencing FIG. 9.

In a step 902 the representation $z_{c, d_1, d_2}$ is determined as described in the step 602 in the method for enhancing the digital image data.

Afterwards in a step 904 and in addition to or instead of modifying the representation as described in step 604, the representation is transmitted or stored. This provides reliable and/or efficient transmission or storage.

In a step 906 the representation $z_{c, d_1, d_2}$ is received from transmission or read from storage.

Afterwards in a step 908 a plurality of elements $x'_{c, d_1, d_2}$ representing pixels of a decoded digital image is determined depending on the representation $z_{c, d_1, d_2}$ as described in step 606.

Encoding and Decoding Digital Video Data, Transmission or Storage

In one aspect a plurality of digital images of a digital video are processed according to the method for encoding digital image data and a method for decoding digital image data in particular for transmission or storage.

Figure 10:
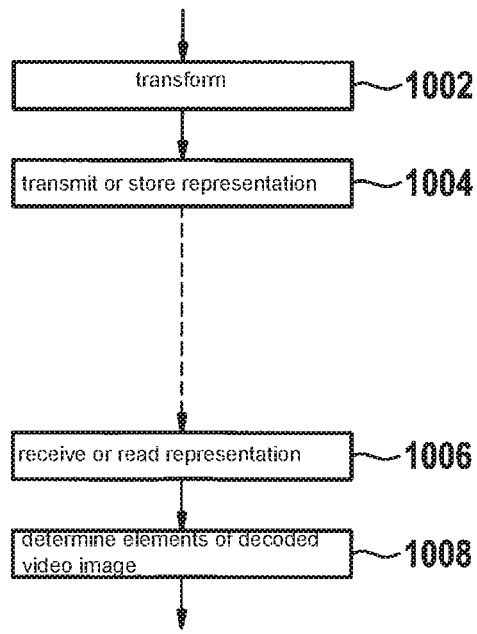
FIG. 10 depicts steps in a method for encoding and decoding digital video data.

In another aspect, a method for encoding digital video data and a method for decoding digital video data in particular for transmission or storage is described referencing FIG. 10.

In step 1002, a plurality of elements $x_{c, t, d_1, d_2}$ representing pixels of the digital image is transformed to a representation $z_{c, t, d_1, d_2}$ as described in step 702.

Afterwards in a step 1004 and in addition to or instead of modifying the representation as described in step 704, the representation $z_{c, t, d_1, d_2}$ is transmitted or stored. This provides reliable and/or efficient transmission or storage.

In a step 1006 the representation $z_{c, t, d_1, d_2}$ is received from transmission or read from storage.

Afterwards in a step 1008 a plurality of elements $x'_{c, t, d_1, d_2}$ representing pixels of a decoded digital video is determined as described in step 706.

Encoding and Decoding Digital Audio Data, Transmission or Storage

Figure 11:
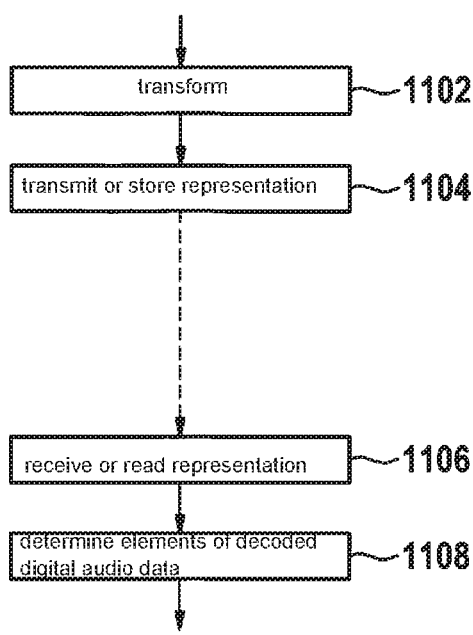
FIG. 11 depicts steps in a method for encoding and decoding digital audio data.

A method for encoding and a method for decoding digital audio data in particular for transmission or storage is described referencing FIG. 11.

In one aspect one channel of a digital audio data sample is processed. In another aspect a plurality of channels is processed.

In a step 1102 for processing one channel, a plurality of elements $x_{t, d_1, d_2}$ representing parts of the audio sample is transformed to a representation $z_{t, d_1, d_2}$ as described in step

802. For processing a plurality of channels, a plurality of elements $x_{c, t, d1, d2}$ comprising the indication c of the channel dimension C are processed as described in step 802.

Afterwards, in a step 1104 the representation $z_{t, d1, d2}$ or the representation $z_{c, t, d1, d2}$ comprising the indication c of the channel dimension C is transmitted or stored.

In a step 1106 the representation $z_{t, d1, d2}$ or the representation $z_{c, t, d1, d2}$ comprising the indication c of the channel dimension C is transmitted or read from storage Afterwards, in a step 1108 a plurality of elements $x'_{t, d1, d2}$ or a plurality of elements $x'_{c, t, d1, d2}$ comprising the indication c of the channel dimension C representing parts of decoded digital audio data is determined as described in step 806.

In the above described steps of modifying the representation, the representation is for example modified for image transformation, for image recognition, for anomaly detection and/or for image validation. The digital audio and digital video data may be processed for the purpose of transformation, recognition, anomaly detection and/or validation as well.

In one aspect an at least partial autonomous vehicle or robot is controlled depending on at least one of the representations described above, depending on a result of processing at least one of these representations and/or by audio data, video data or image data determined by the inversion of the invertible linear mapping as described above.

What is claimed is:

1. A computer implemented method for digital image enhancement, in which each element of a plurality of elements representing a pixel of a digital image includes an indication of a spatial dimension, the spatial dimension indicating a position of the pixel in the digital image, and the element includes an indication of a channel dimension, the channel dimension indicating a channel of the pixel in the digital image, the method comprising the following steps:
   transforming the plurality of elements representing pixels of the digital image to a representation depending on an invertible linear mapping, the invertible linear mapping mapping an input of the plurality of elements to the representation;
   modifying the representation to determine a modified representation depending on the representation;
   determining a plurality of elements representing pixels of an enhanced digital image depending on the modified representation; and
   transforming the modified representation depending on an inversion of the invertible linear mapping, wherein the invertible linear mapping includes at least one autoregressive convolution.

2. The computer implemented method as recited in claim 1, wherein a plurality of digital images of a digital video are processed according to the method.

3. The computer implemented method according to claim 1, wherein a convolutional neural network for the invertible linear mapping determines the representation from the input.

4. The computer implemented method according to claim 1, wherein the representation is determined depending on a first autoregressive convolution of the input and a first convolution filter, and depending a consecutive second autoregressive convolution of the first autoregressive convolution and a second convolution filter.

5. The computer implemented method according to claim 1, wherein the autoregressive convolution imposes an order on the input such that values of the representation for a specific element depend only on elements of the input representing input that is in the imposed order before the specific element in the order.

6. The computer implemented method according to claim 1, wherein an input of an input dimension is mapped to the representation by a plurality of consecutive autoregressive convolutions, wherein a dimension of the consecutive convolutions is equal or less than the input dimension.

7. The computer implemented method according to claim 1, further comprising the following step:
   determining a N-dimensional kernel for the mapping depending on concatenating a plurality of (N−1)-dimensional kernels with identical size one after another along the dimension N.

8. The computer implemented method according to claim 7, wherein determining the N-dimensional kernel includes associating the (N−1)-dimensional kernel to the N-dimensional kernel as a last dimension entry, wherein a size of the last dimension of the N-dimensional kernel defines a center value, wherein for any entries of the N-dimensional kernel in a last dimension of the N-dimensional kernel having an index smaller than the center value, arbitrary values are assigned, wherein for any entries in the last dimension having an index larger than the center value, zeros are assigned.

9. The computer implemented method according to claim 1, wherein the representation is modified for image transformation, and/or for image recognition, and/or for anomaly detection and/or for image validation.

10. The computer implemented method according to claim 1, wherein an at least partial autonomous vehicle or robot is controlled depending on the representation.

11. A computer implemented method for digital video enhancement, in which each element of a plurality of elements representing a pixel of a digital image of a digital video includes an indication of a spatial dimension, the spatial dimension indicating a position of the pixel in the digital image, and the element includes an indication of a channel dimension, the channel dimension indicating a channel of the pixel in the digital image and an indication of a time dimension, the time dimension, indicating a position of the digital image in a video timeline of the digital video, the method comprising the following steps:
   transforming the plurality of elements representing pixels of the digital image to a representation depending on an invertible linear mapping, wherein the invertible linear mapping maps an input of the plurality of elements to the representation;
   modifying the representation to determine a modified representation depending on the representation;
   determining a plurality of elements representing pixels of an enhanced digital video depending on the modified representation; and
   transforming the modified representation depending on an inversion of the invertible linear mapping;
   wherein the invertible linear mapping includes at least one autoregressive convolution.

12. A computer implemented method for digital audio enhancement, in which each element of a plurality of elements representing a part of a digital audio sample includes an indication of a spatial dimension, the indication of the spatial dimension is a constant value, and the element includes an indication of a time dimension, the time dimension indicating a position in an audio timeline of the audio sample, the method comprising the following steps:
   transforming the plurality of elements representing parts of the audio sample to a representation depending on an invertible linear mapping, wherein the invertible linear mapping maps an input of the plurality of elements to the representation;
modifying the representation to determine a modified representation depending on the representation;
determining a plurality of elements representing parts of an enhanced digital audio sample depending on the modified representation; and
transforming the modified representation depending on an inversion of the invertible linear mapping;
wherein the invertible linear mapping includes at least one autoregressive convolution.

13. The computer implemented method according to claim 12, wherein the constant value is one.

14. The computer implemented method according to claim 12, wherein the digital audio sample includes audio channels, wherein each element of the plurality of elements includes an indication of a channel dimension, the channel dimension indicating an audio channel in the audio sample, and the plurality of elements including the indication of the channel dimension and representing parts of the audio sample is transformed to the representation depending on the invertible linear mapping, wherein the invertible linear mapping maps an input of the plurality of elements comprising the indication of the channel dimension to the representation, wherein the representation is modified to determine the modified representation depending on the representation, and wherein the plurality of elements comprising the indication of the channel dimension and representing parts of an enhanced digital audio sample is determined depending on the modified representation, wherein the modified representation s transformed depending on the inversion of the invertible linear mapping.

15. A computer implemented method for encoding digital audio data, in which each element of a plurality of elements representing a part of a digital audio sample includes an indication of a spatial dimension, wherein a first indication and a second indication of the spatial dimension is a constant value, wherein the element includes an indication of a time dimension, the time dimension indicating a position in an audio timeline of the audio sample, the method comprising:
transforming the plurality of elements representing parts of the audio sample to a representation depending on an invertible linear mapping, wherein the invertible linear mapping maps an input of the plurality of elements to the representation; and
transmitting or storing the representation;
wherein the invertible linear mapping includes at least one autoregressive convolution;
wherein the digital audio sample includes audio channels, wherein each element of the plurality of elements includes an indication of a channel dimension, the channel dimension indicating an audio channel in the audio sample, and the plurality of elements including the indication of the channel dimension and representing parts of the audio sample is transformed to the representation depending on the invertible linear mapping, wherein the invertible linear mapping maps an input of the plurality of elements including the indication of the channel dimension to the representation, and wherein the representation is transmitted or stored.

16. The computer implemented method as recited in claim 15, wherein the constant value is 1.

17. A device, comprising:
a processor; and
storage comprising instructions for a convolutional neural network;
wherein the processor is configured for digital image enhancement, in which each element of a plurality of elements representing a pixel of a digital image includes an indication of a spatial dimension, the spatial dimension indicating a position of the pixel in the digital image, and the element includes an indication of a channel dimension, the channel dimension indicating a channel of the pixel in the digital image, the processor configured to:
transform the plurality of elements representing pixels of the digital image to a representation depending on an invertible linear mapping, the invertible linear mapping mapping an input of the plurality of elements to the representation;
modify the representation to determine a modified representation depending on the representation;
determine a plurality of elements representing pixels of an enhanced digital image depending on the modified representation; and
transform the modified representation depending on an inversion of the invertible linear mapping, wherein the invertible linear mapping includes at least one autoregressive convolution.

18. The device according to claim 17, further comprising an output adapted to output a result of an image transformation, an image recognition, an anomaly detection and/or an image validation.

19. The device according to claim 17, further comprising an actuator adapted to control an at least partial autonomous vehicle or robot depending on the representation, and/or depending on a result of processing the representation, and/or depending on image data determined by the inversion of the invertible linear mapping.

20. A non-transitory computer-readable medium on which is stored instructions for digital image enhancement, in which each element of a plurality of elements representing a pixel of a digital image includes an indication of a spatial dimension, the spatial dimension indicating a position of the pixel in the digital image, and the element includes an indication of a channel dimension, the channel dimension indicating a channel of the pixel in the digital image, the instructions, when executed by a computer, causing the computer to perform the following steps:
transforming the plurality of elements representing pixels of the digital image to a representation depending on an invertible linear mapping, the invertible linear mapping mapping an input of the plurality of elements to the representation;
modifying the representation to determine a modified representation depending on the representation;
determining a plurality of elements representing pixels of an enhanced digital image depending on the modified representation; and
transforming the modified representation depending on an inversion of the invertible linear mapping, wherein the invertible linear mapping includes at least one autoregressive convolution.

* * * * *

UNITED STATES PATENT AND TRADEMARK OFFICE
CERTIFICATE OF CORRECTION

PATENT NO. : 11,276,140 B2
APPLICATION NO. : 16/701755
DATED : March 15, 2022
INVENTOR(S) : Emiel Hoogeboom, Dan Zhang and Max Welling It is certified that error appears in the above-identified patent and that said Letters Patent is hereby corrected as shown below:

On the Title Page

In Item (30) Foreign Application Data, replace:
"18210716"

With:
--18210716.9--

Signed and Sealed this
Fifth Day of July, 2022

Katherine Kelly Vidal
*Director of the United States Patent and Trademark Office*